United States Patent
Brueck et al.

(10) Patent No.: US 9,726,061 B2
(45) Date of Patent: Aug. 8, 2017

(54) METHOD FOR OPERATING A DOSING DEVICE AND MOTOR VEHICLE HAVING A DOSING DEVICE

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Jan Hodgson, Troisdorf (DE); Peter Bauer, Siegburg (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/275,246

(22) Filed: May 12, 2014

(65) Prior Publication Data

US 2014/0245720 A1   Sep. 4, 2014

Related U.S. Application Data

(63) Continuation of application No. PCT/EP2012/070357, filed on Oct. 15, 2012.

(30) Foreign Application Priority Data

Nov. 11, 2011   (DE) .................. 10 2011 118 214

(51) Int. Cl.
*F01N 3/00*   (2006.01)
*F01N 3/20*   (2006.01)
(Continued)

(52) U.S. Cl.
CPC ............. *F01N 3/206* (2013.01); *F01N 3/208* (2013.01); *F01N 11/002* (2013.01);
(Continued)

(58) Field of Classification Search
CPC ...... F01N 3/206; F01N 3/208; F01N 13/0097; F01N 2900/1821
See application file for complete search history.

(56) References Cited

U.S. PATENT DOCUMENTS 6,408,619 B1   6/2002   Wissier et al.
6,823,665 B2   11/2004  Hirota et al.
(Continued)

FOREIGN PATENT DOCUMENTS

CN   1386161 A   12/2002
CN   1969114 A   5/2007
(Continued)

*Primary Examiner* — Mark Laurenzi
*Assistant Examiner* — Jason Sheppard
(74) *Attorney, Agent, or Firm* — Laurence A. Greenberg; Werner H. Stemer; Ralph E. Locher

(57) ABSTRACT

A method for operating a dosing device for metering an additive to an exhaust-gas treatment device includes determining a dosing amount of additive required by the exhaust-gas treatment device in step a). Subsequently, in step b), an operating mode for the dosing device is determined by carrying out at least steps b.1) and b.2). In step b.1), at least one characteristic operating value of at least one component of the dosing device is provided being definitive of a degree of aging of the dosing device. In step b.2), an operating mode for the dosing device is set in dependence on the characteristic operating value from step b.1). In step c), the dosing device is operated with the set operating mode so that the dosing amount required in step a) is supplied to the exhaust-gas treatment device. A motor vehicle having a dosing device is also provided.

17 Claims, 1 Drawing Sheet

(51) Int. Cl.
*F01N 11/00* (2006.01)
*F01N 13/00* (2010.01)

(52) U.S. Cl.
CPC ...... *F01N 13/0097* (2014.06); *F01N 2550/05* (2013.01); *F01N 2610/02* (2013.01); *F01N 2900/0421* (2013.01); *F01N 2900/08* (2013.01); *F01N 2900/1402* (2013.01); *F01N 2900/1808* (2013.01); *F01N 2900/1811* (2013.01); *F01N 2900/1814* (2013.01); *F01N 2900/1821* (2013.01); *F01N 2900/1822* (2013.01); *Y02T 10/24* (2013.01); *Y02T 10/47* (2013.01)

(56) References Cited

U.S. PATENT DOCUMENTS

| | | | |
|---|---|---|---|
| 7,017,335 B2 | 3/2006 | Huber et al. | |
| 7,603,845 B2 | 10/2009 | Dionnet et al. | |
| 7,841,168 B2 | 11/2010 | Oswald et al. | |
| 8,407,987 B2 | 4/2013 | Andersson et al. | |
| 8,527,182 B2 | 9/2013 | Minami et al. | |
| 8,555,618 B2 | 10/2013 | Bauer et al. | |
| 9,140,165 B2 | 9/2015 | Bauer et al. | |
| 9,181,834 B2 | 11/2015 | Fokkelman et al. | |
| 2004/0221571 A1* | 11/2004 | Lewis et al. | 60/277 |
| 2009/0217644 A1 | 9/2009 | Jung | |
| 2009/0223208 A1* | 9/2009 | Kojima et al. | 60/286 |
| 2011/0099983 A1* | 5/2011 | Ohno | 60/277 |
| 2013/0232954 A1 | 9/2013 | Brueck et al. | |
| 2013/0283771 A1* | 10/2013 | Nagata | 60/282 |

FOREIGN PATENT DOCUMENTS

| | | |
|---|---|---|
| CN | 101002008 A | 7/2007 |
| DE | 102004021193 A1 | 12/2004 |
| DE | 102008062058 A1 | 6/2010 |
| DE | 102008064606 A1 | 6/2010 |
| DE | 102009023325 A1 | 6/2010 |
| DE | 102009000061 A1 | 7/2010 |
| DE | 102009040111 A1 | 3/2011 |
| DE | 102010013695 A1 | 10/2011 |
| DE | 102010049071 A1 | 4/2012 |
| JP | H07158481 A | 6/1995 |
| JP | H10311212 A | 11/1998 |
| JP | 2002508466 | 3/2002 |
| JP | 2010024893 A | 2/2010 |
| JP | 2010038142 A | 2/2010 |
| WO | 2008103111 A1 | 8/2008 |
| WO | 2009037327 A1 | 3/2009 |
| WO | 2011026531 A1 | 3/2011 |

\* cited by examiner

METHOD FOR OPERATING A DOSING DEVICE AND MOTOR VEHICLE HAVING A DOSING DEVICE

CROSS-REFERENCE TO RELATED APPLICATION

This is a continuation, under 35 U.S.C. §120, of copending International Application No. PCT/EP2012/070357, filed Oct. 15, 2012, which designated the United States; this application also claims the priority, under 35 U.S.C. §119, of German Patent Application DE 10 2011 118 214.8, filed Nov. 11, 2011; the prior applications are herewith incorporated by reference in their entirety.

BACKGROUND OF THE INVENTION

Field of the Invention

The invention relates to a method for operating a dosing or metering device for metering or adding an additive to an exhaust-gas treatment device. In the automotive field in particular, for the purification of the exhaust gases of internal combustion engines, widespread use is made of exhaust-gas treatment devices to which a (liquid) additive (fuel, reducing agent, etc.) is supplied. The invention also relates to a motor vehicle having a dosing device.

A particularly commonly used exhaust-gas purification method is the selective catalytic reduction (SCR) method in which nitrogen oxide compounds in the exhaust gas are reduced with the aid of a reducing agent that is metered in. Ammonia is often used as reducing agent. Ammonia is normally not stored in motor vehicles directly but rather, for example, in the form of a reducing agent precursor solution which can be converted to form ammonia (the actual reducing agent). The conversion may take place thermally by heating the reducing agent precursor (by using a heater and/or the hot exhaust gas) to an adequately high temperature, or hydrolytically using a hydrolysis catalytic converter which catalyzes the conversion. Furthermore, the conversion may take place outside the exhaust gas in a reactor, provided specifically for that purpose, outside the exhaust-gas treatment device, and/or may take place within the exhaust gas in the exhaust-gas treatment device. In the case of the conversion within the exhaust gas, the reducing agent precursor solution is supplied directly to the exhaust gas and is converted purely thermally or hydrolytically in the exhaust gas to form ammonia. The expressions "reducing agent" and "reducing agent precursor" will hereinafter be used synonymously for one another.

A dosing device may be provided in a motor vehicle for the supply of the reducing agent into an exhaust-gas treatment device. The dosing device delivers the reducing agent from a tank into the exhaust-gas treatment device, in particular upstream of a mixer and/or catalytic converter in the exhaust line. A dosing device includes, for example, a delivery pump, which serves for the delivery of the reducing agent, and a dosing device, which serves for the dosing of the reducing agent into the exhaust-gas treatment device. The dosing device may be in the form of an injector which can be opened and closed. Likewise, a dosing device may also have a dosing pump which performs both the delivery of the reducing agent and the dosing of the reducing agent. Dosing devices are also known which have both a dosing pump and an additional dosing device in the form of an injector/valve.

For the automotive field in particular, it is necessary, due to the high unit quantities produced, for the dosing device and an associated additive tank for the withdrawal of the additive to be particularly robust and, above all, inexpensive. Accordingly, there is great interest in being able to use particularly inexpensive components, such as pumps, injectors and lines, for the dosing device.

At the same time, the dosing accuracy of the dosing device should be as high as possible in order firstly to always be able to provide sufficient reducing agent to the exhaust-gas treatment device and secondly to keep the consumption of reducing agent as low as possible.

SUMMARY OF THE INVENTION

It is accordingly an object of the invention to provide a method for operating a dosing device and a motor vehicle having a dosing device, which overcome the hereinafore-mentioned disadvantages and alleviate the highlighted technical problems of the heretofore-known methods and vehicles of this general type. It is sought, in particular, to describe an especially advantageous method for operating a dosing device, with which particularly high dosing accuracy can be achieved. It is also an object to further reduce the susceptibility to failure, and complexity, of such dosing methods. It is likewise desirable for the method to be usable on different embodiments of the dosing device, and if appropriate also to take into consideration, and be adaptable in a simple manner, to changes that arise with progressive operating duration.

With the foregoing and other objects in view there is provided, in accordance with the invention, a method for operating a dosing device for metering an additive to an exhaust-gas treatment device, which method comprises at least the following steps:

a) determining a dosing or metering amount of the additive required or demanded by the exhaust-gas treatment device;

b) determining an operating mode for the dosing device, in which at least the following sub-steps are carried out:

b.1) determining at least one characteristic operating value of at least one component of the dosing device which is definitive of a degree of aging of the dosing device (1);

b.2) setting an operating mode for the dosing device in a manner dependent on the characteristic operating value from step b.1); and c) operating the dosing device with the set operating mode in such a way that the dosing amount required or demanded in accordance with step a) is supplied to the exhaust-gas treatment device.

In particular, the dosing device has a pump for the delivery of the additive. The pump may be either purely a delivery pump, which performs merely a delivery function, or a dosing pump, which both serves for the delivery of the reducing agent and performs precise dosing. In this case, in particular, the expression "dosing" means the (apportioned) supply of the demanded dosing amount in step c). If the pump is purely a delivery pump, the dosing device generally has an additional dosing device which performs the dosing. The dosing device may, for example, be an injector or a valve. The delivery pump then provides a pressurized additive. The dosing amount in step c) can be set by using the opening time of the dosing device. If the dosing device includes a dosing pump, no additional dosing device is required for dosing purposes. It is then, for example, possible for a passive or self-opening injection valve to be used instead of an injector.

A separate control unit may, for example, be provided for carrying out the method. If the method is carried out in a motor vehicle for the provision of an additive in an exhaust-gas treatment device, the method may if appropriate also be executed by the engine control unit of the motor vehicle. A control unit for carrying out the method may also be provided in a dosing device.

An additive refers, in particular, to a reducing agent. The method very particularly preferably relates to the metering of a reducing agent solution, such as in particular urea or AdBlue® (clear, synthetically produced 32.5 percent solution of high-purity urea in demineralized water).

The demanded dosing amount represents the amount of additive required in the exhaust-gas treatment device at a particular point in time in order to achieve a desired reaction. The required or demanded dosing amount is, in particular, an amount specified by a control unit for the dosing device. The required or demanded dosing amount is typically set by the control unit in a manner dependent on various operating parameters of the exhaust-gas treatment device, of the internal combustion engine to which the exhaust-gas treatment device is connected, and/or of a motor vehicle (which has the exhaust-gas treatment device and the internal combustion engine). The required or demanded dosing amount of the exhaust-gas treatment device generally refers to the amount of additive that is required for effectively carrying out an exhaust-gas purification method in the exhaust-gas treatment device. The required or demanded dosing amount may, for example, be calculated on the basis of present measurement values and/or operating modes of the internal combustion engine and/or of the exhaust-gas treatment device, and/or may be selected from a data memory (characteristic map).

In particular operating situations of the dosing device, however, it may also be the case that other influential variables influence the required or demanded dosing amount. For example, the required or demanded dosing amount may be limited if only a limited amount of additive remains available in a tank from which the dosing device delivers the additive. It is likewise possible for the required or demanded dosing amount to be limited if a higher dosing amount would exceed the maximum delivery capability of the dosing device.

The operating mode, to be determined in step b), for the dosing device preferably includes an operating algorithm on the basis of which the dosing device is operated in order to provide the required or demanded dosing amount in the exhaust-gas treatment device. The operating algorithm in turn includes at least one operating function which sets a particular detail of the operating mode (sub-process). The operating algorithm with its operating functions may be stored in the control unit which is set up for carrying out the method. If, for the dosing in the dosing device, use is made of a dosing device (for example an injector), the operating mode may, for example, have an operating function which defines a relationship between an actuation of the dosing device and the required or demanded dosing amount in a manner dependent on at least one operating parameter. If a dosing pump is used for the dosing, the operating mode includes, for example, an operating function which defines a relationship between the required or demanded dosing amount and an input-signal of the dosing pump in a manner dependent on at least one operating parameter.

For the determination of the operating mode, in step b.1), a characteristic operating value of at least one component of the dosing device is firstly determined. The expression "characteristic operating value" refers to a property of a component of the dosing device which is of relevance for the amount of reducing agent delivered by the dosing device and/or the amount of fluid dosed by the dosing device. The characteristic operating value represents the aging of the dosing device. The amounts of additive dosed in the presence of constant operating parameters of the dosing device vary, because the dosing device ages. For example, the behavior of valves and pumps in dosing devices changes due to aging. It is therefore advantageous for the aging of the dosing device to be taken into consideration by way of a representative characteristic operating value. In this case, a characteristic operating value refers, in particular, to a property of the dosing device that changes at most slowly over the entire operating duration of the dosing device. In particular, this does not refer to a property that may fluctuate over short timescales, such as for example the temperature of the dosing device. The characteristic operating value may also be a calculated variable which is affected by various influential variables relating to the operation of the dosing device.

The setting of an operating mode for the dosing device should then be performed in a manner dependent on at least one of the above characteristic operating values, in such a way that accordingly, the dosing device is operated, in particular, in an operating mode that is assigned to the age of the dosing device. It is thus possible, for example, for known and/or predictable and/or measurable changes in the dosing behavior of the components of the dosing device to be compensated. If corresponding compensation is required, the dosing device can be operated with the correspondingly suitable set operating mode, in such a way that precisely the demanded dosing amount is supplied to the exhaust-gas treatment device.

In this way, it is possible in particular for the method to be calibrated at predefined points in time, and/or after predefined intervals, over the operating duration of the dosing device, wherein the aging of the dosing device and/or of the exhaust-gas treatment device is jointly taken into consideration. This makes it possible, even when the dosing device has aged to a great extent, to realize particularly precise metering and thus efficient operation of the exhaust-gas treatment device. In this case, it is particularly advantageous for the calibration to take place in an autonomous or automatic manner, in such a way that the maintenance of the dosing device can be simplified.

In accordance with another particularly advantageous mode of the method of the invention, for the characteristic operating value in step b.1), consideration is given to at least one of the following parameters relevant to the aging of the dosing device:
  number of dosing processes that have heretofore been performed,
  age of the dosing device, and
  past operating duration of the dosing device.

The stated parameters are preferably taken into consideration with a respective weighting. In this case, taking the parameters into consideration with a weighting means that the parameters are each multiplied by a factor or exponentiated with an exponent in order to take into consideration the effect of the parameter on the characteristic operating value.

In the method described herein, for the characteristic operating value, consideration is given to the number of dosing processes that have heretofore been performed, to the age of the dosing device, and/or to the past operating duration of the dosing device. All three of the different parameters have in common the fact that they represent a degree for the life time of the dosing device.

The number of dosing processes that have heretofore been performed may be characterized by using different method steps. If an injector is used as a dosing device for dosing purposes, the number of dosing processes that have been performed may, for example, be increased by one every time the injector opens and/or closes. If a dosing pump is used for dosing purposes, the number may, for example, be increased by one every time a signal for the demand of a dosing amount of additive is output by a control unit for the exhaust-gas treatment device. If the dosing pump has a rotary drive, the number of dosing processes that has heretofore been performed may be determined from the number of revolutions of the rotary drive. In this case, the number of dosing processes may be calculated as a product of a (stored) average value of dosing processes per revolution and the number of revolutions. The number of dosing processes that have heretofore been performed is consequently registered and tracked, for example by virtue of a corresponding counter being increased, and stored, by the control unit. Accordingly, the dosing processes are, in particular, continuously updated starting from the time after the installation of the components.

The age of the dosing device refers, for example, to the time period since the dosing device was first operated. The time period may be calculated by a control unit from the present date and a date of first operation stored in a memory.

The past operating duration of the dosing device may, for example, be calculated by adding up the operating duration periods in which the dosing device has been in operation. In this case, consideration may be given optionally to the actual time during which additive has been supplied to the exhaust-gas treatment device, or the entire time during which the dosing device was actively available for the provision of additive.

In accordance with a further advantageous mode of the method of the invention, for the characteristic operating value in step b.1), consideration is given to at least a number of occurrences of the following events relevant to the aging of the dosing device:
  number of freezing processes to which the dosing device has been exposed;
  number of emergency deactivations of the dosing device;
  number of hot shutdown processes of an internal combustion engine which is connected to the exhaust-gas treatment device;
  number of instances of misfueling of a tank from which the dosing device extracts the additive; and
  number of phases in which the dosing device has been deactivated for longer than a predefined time interval.

The described events can have a significant influence on the aging of the dosing device. The events therefore also influence the dosing amount that is dispensed by the dosing device in the presence of particular operating parameters. It is proposed herein, in particular, that, for the characteristic operating value in step b.1), consideration be given to the frequency with which the described relevant events (number of occurrences) have occurred at the dosing device since first operation or since the production of the dosing device.

Freezing processes can cause liquid-conducting components of the dosing device (in particular ducts, valves and/or pumps) to be permanently changed. For example, ducts may deform irreversibly under the action of the ice pressure that acts during the freezing process. That may lead to a change in the dosed amount of additive, even if there is no damage to the dosing device or of the ducts. In particular, emergency deactivations of the dosing device can give rise to aging phenomena on components with movable parts (such as, for example, a pump and/or a valve). During hot shutdown processes, an internal combustion engine connected to the exhaust-gas treatment device is initially operated at high load, in such a way that a high exhaust-gas temperature prevails. The internal combustion engine is then suddenly stopped. The exhaust-gas treatment device then cools down quickly, in such a way that very large temperature gradients arise in the exhaust-gas treatment device. Hot shutdown processes have an effect, in particular, on an injection device of a dosing device and on valves in the injection device, because the injection device is disposed particularly close to the exhaust-gas treatment device. In the event of instances of misfueling, an unsuitable fluid (which is not intended for the operation of the dosing device) passes into a tank for the additive. For example, an additive tank intended for urea-water solution is filled with fuel. The fuel then passes into the dosing device and changes the flow behavior for the additive through lines and valves. The change may be irreversible and thus influence the dosed amount of additive. Relatively long standstill phases may, for example, be characterized by a time interval of more than two weeks, more than one month or more than three months. In such standstill phases, deposits can form in the lines of the dosing device, in particular if the ducts of the dosing device are filled with the additive during the standstill phase. If the additive is urea-water solution, crystalline deposits, for example, may form. The deposits can influence the components of the dosing device. For example, the surfaces of the ducts of the dosing device can be roughened by the movements of the deposits through the ducts. The flow resistance of the ducts can thus be changed. This, too, changes the dosed amount of additive.

In accordance with an added advantageous mode of the method of the invention, for the characteristic operating value in step b.1), consideration is given to at least one of the following operating conditions that have prevailed during the operation of the dosing device in at least one prior time interval:
  a load range in which the dosing device has been operated, and
  a temperature that prevailed in the dosing device.

The operation of the dosing device has a varying effect on the aging of the dosing device depending on what operating conditions the dosing device is operated under. For example, a set number of dosing processes yields more intense aging if the temperature of the dosing device (or of the connected exhaust-gas treatment device) is elevated and/or the dosing device is operated at full load. For the characteristic operating value, all operating parameters of the dosing device which are available in a control unit may be taken into consideration as operating conditions in step b.1). A prior time interval refers, in particular, to a time period that precedes the determination of the characteristic operating value in the respective execution of the described method. This preferably refers to a time interval which starts at a point in time before the respective execution of the described method and which ends upon the respective execution of the described method. The point in time may, for example, be the point in time of a preceding execution of the method according to the invention.

In accordance with an additional particularly advantageous mode of the method of the invention, at least one operating condition is taken into consideration in combination with at least one of the following parameters, already mentioned further above, for the characteristic operating value:

number of dosing processes that have heretofore been performed,
  age of the dosing device, and
  past operating duration of the dosing device.

Individual dosing processes or groups of dosing processes, time periods of the aging of the dosing device or time periods of the operating duration of the dosing device may then be taken into consideration with a weighting, in each case in accordance with the present operating conditions.

In this case, taking the stated parameters into consideration "with a weighting" means that the parameters influence the characteristic operating value to varying degrees in a manner dependent on the at least one operating condition. It is particularly advantageous for the operating conditions of the dosing unit to be sorted, on the basis of the operating parameters, into a categorization system of operating condition categories, and for a particular weighting of the parameters or events for the characteristic operating value to be implemented for each category. For example, the categories: 1 (non-critical), 2 (critical) and 3 (highly critical) may be provided, wherein the normal operation of the dosing device is sorted into category (1), operation at full load falls into category (2), and category (3) is provided for exceptional, unintended operating conditions (such as, for example, an excessive operating temperature of the dosing device).

In accordance with yet another preferred mode of the method of the invention, in step b.1), at least one characteristic operating value is read out from a memory, wherein the at least one characteristic operating value is updated in the memory at regular intervals, wherein, for the update, consideration is given to at least one relevant parameter, at least one relevant event or at least one relevant operating condition from at least one prior time interval.

The stated parameters and/or events are preferably relevant to and/or representative of the aging of the dosing device. A memory may, for example, be provided in a control apparatus or control unit which is set up for carrying out the method according to the invention. A relevant parameter or a relevant operating condition preferably prevailed in the stated time interval. A relevant event preferably occurred in the stated time interval. For the updating of the stored operating value, it is preferably the case that respectively relevant parameters, events or operating conditions are determined which were determined in a prior time interval between the update and a preceding, prior update. It is accordingly not necessary for all of the parameters, events and/or operating conditions taken into consideration for the characteristic operating value to be recorded permanently. The items of information regarding these can in each case be deleted if they are already manifest in the stored characteristic operating value and/or if they have already been taken into consideration in an update of the characteristic operating value.

In accordance with yet a further mode of the method of the invention, in step a), for the determination of the dosing amount, consideration is given to at least one of the following operating parameters of the exhaust-gas treatment device:

exhaust-gas temperature,
  exhaust-gas composition,
  exhaust-gas mass flow rate,
  activity of a catalytic converter in the exhaust-gas treatment device, and
  loading of a particle separator in the exhaust-gas treatment device.

It is particularly preferable for a multiplicity of the operating parameters, if appropriate even all of the operating parameters, to be taken into consideration. The operating parameters may be calculated and/or measured. For this purpose, the determination of the operating parameters should, in particular, be performed close to the time of dosing, in such a way that it is possible to obtain a description of the state of the exhaust-gas treatment device which is applicable, with good accuracy, to the time of dosing.

The exhaust-gas temperature may also be determined indirectly using the temperature of a component of the exhaust-gas treatment device. On the basis of the exhaust-gas temperature, it is determined whether or not the additive supplied to the exhaust-gas treatment device can be converted and utilized in an effective manner in the exhaust-gas treatment device. It is thus possible for the exhaust-gas temperature to be taken into consideration for the required or demanded dosing amount.

The exhaust-gas composition (that is to say, for example, the fractions of nitrogen oxides, particles, oxygen, etc.) and/or the exhaust-gas mass flow rate may also be determined from the present metering of the fuel-air mixture to the internal combustion engine. The exhaust-gas composition and the exhaust-gas mass flow rate determine the quantity of pollutants capable of being converted that are actually present in the exhaust gas. The exhaust-gas composition and the exhaust-gas mass flow rate can therefore be used for setting the dosing amount.

As a measure for the activity of a catalytic converter, consideration may be given to the ambient conditions (for example exhaust-gas temperature, exhaust-gas composition, exhaust-gas mass flow rate, temperature of the catalytic converter) and/or to the coating thereof. The activity of a catalytic converter indicates the quantity of hazardous exhaust-gas constituents that can be converted by the catalytic converter. It is therefore not expedient to supply more additive than is permitted by the activity of the catalytic converter. This defines the influence of the activity of a catalytic converter on the dosing amount.

The loading of a particle separator is, in particular, a degree of the quantity of particles (soot, etc.) presently stored in the particle separator. The loading of a particle separator indicates the percentage to which the particle separator has been filled. If the additive to be metered is used for the conversion of particles in a particle separator, the demanded dosing amount may be set as a function of the loading of a particle separator.

In accordance with yet an added particularly advantageous mode of the method of the invention, in step a), for the determination of the dosing amount, consideration is given to at least one of the following operating parameters of an internal combustion engine which is connected to the exhaust-gas treatment device:

torque,
  engine speed,
  power output, and
  lambda value.

The operating parameters of torque, engine speed, power output and lambda value of an internal combustion engine each individually have an influence on the operating parameters, described further above, of the exhaust-gas treatment device, and may therefore likewise alternatively or additionally be used for the setting of the dosing amount.

The stated operating parameters have an influence on the amount of additive that is required for the effective conversion of pollutant constituents in the exhaust gas in the exhaust-gas treatment device. It is therefore advantageous for the demanded dosing amount of additive to be determined as a function of at least one of the parameters.

In accordance with yet an additional advantageous mode of the method of the invention, in step c), consideration is given to at least one operating parameter of the dosing device from the following group:
  pressure of the additive in the dosing device,
  fill level in a tank of the dosing device,
  temperature of the dosing device, and
  vibration of the dosing device.

Operating parameters of the dosing device are to be distinguished from the characteristic operating values described further above. Operating parameters may be subject to short-term fluctuations during operation, whereas characteristic operating values generally change only very slowly or over the long term.

The amount of additive provided by the dosing device is influenced by the stated operating parameters too, in addition to the characteristic operating values taken into consideration in step b) of the method. By contrast to the more long-term adaptation of the operating mode of the dosing device to changes of the dosing device as performed in step b), taking into consideration the operating parameters mentioned herein yields a short-term adaptation of the operating mode of the dosing device to interfering factors and/or to ambient conditions.

It is particularly preferable for a multiplicity of the operating parameters of the dosing device, if appropriate even all of the operating parameters, to be taken into consideration. The operating parameters may be calculated and/or measured. For this purpose, the determination of the operating parameters should, in particular, be performed close to the time of dosing, in such a way that it is possible to obtain a description of the state of the dosing device which is applicable to the time of dosing with good accuracy.

The pressure of the additive in the dosing device may be determined by using a pressure sensor which communicates with the line system for the additive. The fill level of the additive in the tank may be determined by using a fill level sensor or calculated by using a control unit. A temperature which is characteristic of the dosing device or of the additive situated therein may be determined by using a temperature sensor which is coupled to the tank and/or to the line system and/or to a component of the dosing device. Vibrations of the dosing device may, for example, be derived from the operation of a pump or the like.

In accordance with again another advantageous mode of the method of the invention, the operating mode set in step b.2) includes at least one of the following operating functions which define the operation of a dosing pump or of an injector and which are influenced in a manner dependent on the characteristic operating values:
  activation current profile for the dosing pump;
  activation current profile for the injector;
  activation frequency for the dosing pump, and
  activation frequency for the injector.

The injector and the dosing pump normally have electromagnetic drive coils. When a current flows through the coils, an electromagnetic force is generated which has the effect that the dosing pump performs a dosing movement and/or delivery movement and/or the injector performs a dosing movement or opens. The reaction of the delivery pump and/or of the injector varies in a manner dependent on the configuration of the activation current profile of the delivery pump and/or of the injector. An activation current profile may, for example, initially rise quickly to a high opening current value in order to open an injector quickly. The opening current value may be maintained for a defined time interval before subsequently falling to a reduced holding current value in order to save energy. For example, the opening current value, the defined time interval and/or the holding current value may be set or adapted in a manner dependent on the characteristic operating values.

If, as an operating parameter, the activation frequency of the dosing pump and/or of the injector is varied, this means for example that it is defined whether, for example, a multiplicity of small or short delivery strokes or injection opening times should be realized or a relatively small number of larger delivery strokes or longer injection opening times should be realized. If the characteristic operating values from step b.1) yield that the reaction capability of the dosing device (or of the injector and/or of the dosing pump) is impaired, the activation frequency can be reduced. Then, to provide the same dosing amount in a certain time interval, only a small number of dosing processes, each however with an increased dosing amount, are performed.

In accordance with again a further advantageous mode of the method of the invention, in step b.2), the characteristic operating value is compared with at least one reference value, and at least one operating function of the operating mode is selected from a multiplicity of predefined operating functions in a manner dependent on the comparison.

It is preferable for a table or a characteristic map of reference values and/or of reference value ranges to be provided. It is preferable for a (single) operating function to be predetermined for predefined reference values or for predefined reference value ranges. If the characteristic operating value reaches such a (new) reference value or reference value range, the at least one operating function associated therewith is (newly) selected.

In accordance with again an added advantageous mode of the method of the invention, in a step b.3), a number of repetitions is set, wherein the method is executed with the steps a) and c), and a counter is increased in step b.3) in each case, until the counter has reached the number of repetitions, and then steps b.1) and b.2) are executed.

The method step b) including the method steps b.1) to b.2) is accordingly not performed every time method steps a) and c) are performed. It is thus possible in a practical manner for adaptation intervals or adaptation times to be predefined in order to keep the regulation expenditure for the method low.

In accordance with again an additional advantageous mode of the method of the invention, the number of repetitions is set in a manner dependent on a characteristic operating value.

In this case, characteristic operating values include the characteristic operating values determined in step b.1) of the method. If, for example, the number of dosing processes that have heretofore been performed, the age of the dosing device and/or the past operating duration of the dosing device are low, it is expedient for the number of repetitions for step b.4) to be set relatively low because significant changes in the characteristics of the dosing device may yet occur. Over the long term, it may be the case that the properties of the dosing device become established and no longer vary rapidly as a function of the characteristic operating values.

In accordance with still another mode of the method of the invention, the dosing device has a delivery pump and an injector, and, in step c), the set dosing amount from step a) is implemented by using the dosing pump and by using the injector.

A combined dosing device of that type is known, for example, from German Patent Application DE 10 2010 049 071, corresponding to U.S. Patent Application Publication No. US 2013/0232954, which is owned by the Applicant of the instant application. In that document, it is explained, in particular, that the accuracy of a dosing pump is often significantly greater than the dosing accuracy of an injector. Furthermore, in that document, consideration is given to the fact that, when use is made of an inexpensive dosing pump, the minimum achievable flow rate output is significantly higher than that which is possible with an injector. Accordingly, it may be expedient for very small dosing amounts to be defined by using the injector, and for relatively large dosing amounts to be defined by using the dosing pump. This combined strategy in the case of such dosing devices permits inexpensive and precise operation.

In the case of a dosing device of that type, the demanded dosing amount may be supplied by using the injector of the exhaust-gas treatment device. In this case, the dosing pump is temporarily operated as a (normal) delivery pump in order to provide the injector with the additive at a defined pressure. For this purpose, the dosing pump is controlled by using the signal of a pressure sensor which monitors the pressure prevailing at the injector. Due to the fact that use is made of a dosing pump, however, it is possible to precisely determine the actual magnitude of the amount of additive that has passed through the dosing pump. Accordingly, over multiple dosing processes of the injector, it is possible for the total dosing amount dosed by using the injector to be monitored by using the dosing pump, by virtue of the dosing amount determined by the injector and the dosing amount determined by the dosing pump being compared with one another. Various operating functions of an operating algorithm for the injector may then be adapted on the basis of the monitoring or on the basis of the comparison.

The construction of such a combined dosing device is shown, for example, in FIG. 1 of German Patent Application DE 10 2010 049 071, corresponding to U.S. Patent Application Publication No. US 2013/0232954 and explained in the description relating to that figure. The illustrations and explanations may also be taken into consideration in this case for illustrative purposes, and reference is therefore made thereto in their entirety. The sequence of a dosing method that can be performed by using such a combined dosing device is recited, for example, in claims 1 to 3 of that document and in the associated description. Reference is likewise made in this case to the explanations in their entirety and the entire documents are incorporated herein by reference.

In the case of such a combined dosing device, it is particularly advantageous if, in method step b.2), an operating mode of the dosing pump is set, and the operating mode of the injector is not influenced in method step b.2). In the case of a combined dosing device, the operating mode of the injector is already adapted on the basis of the monitoring of the injector by using the dosing pump. If only the operating mode of the dosing pump is adapted in method step b.2), this simultaneously also has an effect for the injector due to the monitoring of the injector by using the dosing pump. It is accordingly possible to realize a particularly good adaptation of the dosing device to changed characteristic operating values with particularly low technical expenditure.

With the objects of the invention in view, there is concomitantly provided a motor vehicle comprising an internal combustion engine, an exhaust-gas treatment device for the purification of the exhaust gases of the internal combustion engine, a dosing device for metering reducing agent to the exhaust-gas treatment device, and a control unit which is constructed, set up and programmed to carry out the method according to the invention.

Other features which are considered as characteristic for the invention are set forth in the appended claims, noting that the features specified individually in the claims may be combined with one another in any desired technologically meaningful way and may be supplemented by explanatory facts from the description. The description, in particular in conjunction with the figures, explains the invention, with further embodiments of the invention being specified.

Although the invention is illustrated and described herein as embodied in a method for operating a dosing device and a motor vehicle having a dosing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
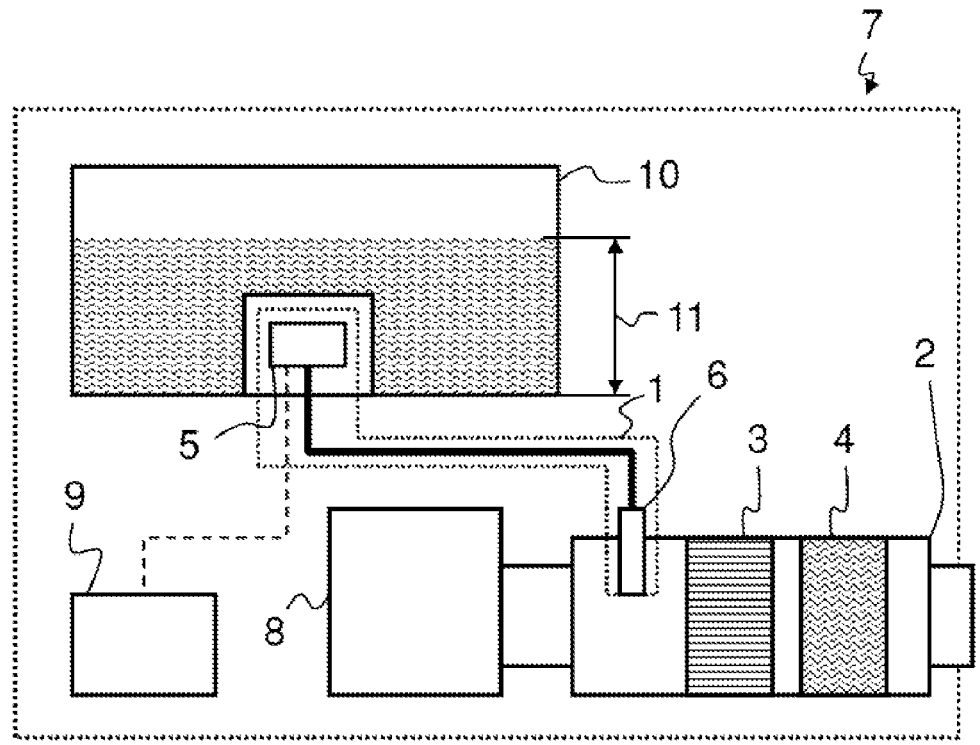
FIG. 1 is a block diagram of a motor vehicle having a dosing device and a control unit which are configured for operating the dosing device.

Referring now in detail to the figures of the drawing for explaining the invention and the technical field in more detail by showing particularly preferred structural variants to which the invention is not restricted and in which dimensional relationships are diagrammatic, and first, particularly, to FIG. 1 thereof, there is seen a motor vehicle 7 which has an internal combustion engine 8 and an exhaust-gas treatment device 2 for the purification of exhaust gases of the internal combustion engine 8. A catalytic converter 3 and a particle separator 4 for the purification of the exhaust gases are illustrated in the exhaust-gas treatment device 2. It is not imperative for precisely one catalytic converter 3 and one particle separator 4 to be provided in the exhaust-gas treatment device. Any desired configurations with at least one particle separator 4 and/or at least one catalytic converter 3 are possible. An additive (in particular a urea-water solution) can be supplied to the exhaust-gas treatment device 2 by using a dosing device 1. The dosing or metering device 1 is connected to a tank 10 and withdraws the additive from the tank 10. In this case, the tank 10 is, for example, filled with additive up to a fill level 11. The dosing device 1 has a dosing pump 5 and an injector 6. A dosing device 1 which has both a dosing pump 5 and an injector 6 is merely one structural variant. The dosing device may optionally have a passive injection device, such as, for example, a self-opening valve and/or a nozzle, instead of the injector 6.

Furthermore, purely a delivery pump without a dosing function may be provided instead of the dosing pump 5. The dosing device 1 is controlled by a control unit 9, wherein the latter may be formed separately or may be formed as part of an engine controller of the motor vehicle.

Figure 2:
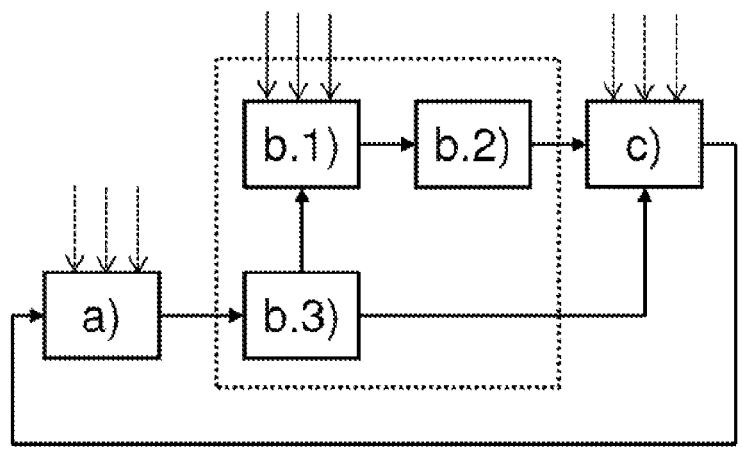
FIG. 2 is a flow diagram of a structural variant of the method according to the invention.

FIG. 2 shows a flow diagram of an exemplary embodiment of the method according to the invention. The figure shows method steps a), b) and c), which are performed repeatedly at regular intervals in the manner of a loop. The method step b) breaks down into method steps b.1), b.2) and b.3). The method step b.3) is performed during every execution of the method. As part of the method step b.3), a counter is increased. The method steps b.1) and b.2) are carried out every time the counter in step b.3) reaches a number of repetitions. In the method step a), arrows indicate operating parameters of an exhaust-gas treatment device and of an internal combustion engine that may be used for setting of the dosing or metering amount. In the method step c), arrows indicate operating parameters of the dosing device that may be taken into consideration in the implementation, in step c), of the dosing amount set in step a). In the method step b.1), arrows indicate characteristic operating values that may be taken into consideration for the setting of the operating mode of the dosing device in the step b.2). Reference is made to the general description given further above for a more detailed explanation of the actions within the steps.

The present invention has the effect that the technical problems highlighted in conjunction with the prior art can be alleviated. In particular, with the method according to the invention, the operation of a dosing device is possible with a particularly high level of dosing accuracy. In this case, the susceptibility to failure and the complexity have been further reduced in relation to known dosing methods. It has likewise been achieved that the method is usable on different embodiments of the dosing device and, if appropriate, also takes into consideration, and is adaptable in a simple manner, to changes that arise with progressive operating duration.

The invention claimed is:

1. A method for operating a doser for adding an additive to an exhaust-gas treatment device, the method comprising the following steps:
   a) determining a dosing amount of the additive required by the exhaust-gas treatment device;
   b) determining an operating mode for the doser by carrying out at least the following steps:
      b.1) determining, directly at the doser, at least one characteristic operating value of at least one component of the doser being definitive of a degree of aging of the doser, the at least one characteristic operating value referring to a property of the at least one component of the doser and the property not fluctuating over short timescales making the property a count variable;
      b.2) setting the operating mode for the doser in dependence on the at least one characteristic operating value from step b.1);
   c) operating the doser with the set operating mode to supply the dosing amount required in accordance with step a) to the exhaust-gas treatment device; and
   d) setting a number of repetitions in which the method is executed with the steps a) and c), increasing a counter in each case, until the counter has reached the number of repetitions, and then executing steps b.1) and b.2).

2. The method according to claim 1, which further comprises giving consideration, for determining the at least one characteristic operating value in step b.1), to at least one of the following parameters relevant to the aging of the doser:
   number of dosing processes having been previously performed,
   age of the doser, or
   past operating duration of the doser.

3. The method according to claim 1, which further comprises, giving consideration for determining the at least one characteristic operating value in step b.1), to at least one of the following operating conditions having prevailed during the operation of the doser in at least one prior time interval:
   load range in which the doser has been operated, or
   temperature that prevailed in the doser.

4. The method according to claim 1, which further comprises, in step b.1), reading out the at least one characteristic operating value from a memory, updating the at least one characteristic operating value in the memory at regular intervals, and giving consideration, for the update, to at least one relevant parameter, at least one relevant event or at least one relevant operating condition from at least one prior time interval.

5. The method according to claim 1, which further comprises, in step a) giving consideration, for determining the dosing amount, to at least one of the following operating parameters of the exhaust-gas treatment device:
   exhaust-gas temperature,
   exhaust-gas composition,
   exhaust-gas mass flow rate,
   activity of a catalytic converter in the exhaust-gas treatment device, or loading of a particle separator in the exhaust-gas treatment device.

6. The method according to claim 1, which further comprises, in step a) giving consideration, for determining the dosing amount, to at least one of the following operating parameters of an internal combustion engine connected to the exhaust-gas treatment device:
   torque,
   engine speed,
   power output, or
   lambda value.

7. The method according to claim 1, which further comprises, in step c), giving consideration to at least one operating parameter of the doser selected from the following group:
   pressure of the additive in the doser,
   fill level in a tank of the doser,
   temperature of the doser, or
   vibration of the doser.

8. The method according to claim 1, which further comprises including in the operating mode set in step b.2) at least one of the following operating functions defining an operation of a delivery pump or of an injector being influenced in a manner dependent on the at least one characteristic operating value:
   an activation current profile for the delivery pump;
   an activation current profile for the injector;
   an activation frequency for the delivery pump, or
   an activation frequency for the injector.

9. The method according to claim 1, which further comprises, in step b.2), comparing the at least one characteristic operating value with at least one reference value, and selecting at least one operating function of the operating mode from a plurality of predefined operating functions in dependence on the comparison.

10. The method according to claim 1, which further comprises setting the number of repetitions in dependence on a characteristic operating value.

11. The method according to claim 1, which further comprises providing the doser with a dosing pump and an injector, and, in step c), implementing the set dosing amount from step a) by using the dosing pump and by using the injector.

12. A method for operating a doser for adding an additive to an exhaust-gas treatment device, the method comprising the following steps:
   a) determining a dosing amount of the additive required by the exhaust-gas treatment device;
   b) determining an operating mode for the doser by carrying out at least the following steps:
      b.1) determining, directly at the doser, at least one characteristic operating value of at least one component of the doser being definitive of a degree of aging of the doser, the at least one characteristic operating value referring to a property of the at least one component of the doser and the property not fluctuating over short timescales making the property a count variable, and giving consideration, for determining the at least one characteristic operating value in step b.1), to at least a number of occurrences of the following events relevant to the aging of the doser:
         number of freezing processes to which the doser has been exposed,
         number of emergency deactivations of the doser,
         number of hot shutdown processes of an internal combustion engine connected to the exhaust-gas treatment device,
         number of instances of misfueling of a tank from which the doser extracts the additive, or
         number of phases in which the doser has been deactivated for longer than a predefined time interval;
      b.2) setting the operating mode for the doser in dependence on the at least one characteristic operating value from step b.1);
      and
   c) operating the doser with the set operating mode to supply the dosing amount required in accordance with step a) to the exhaust-gas treatment device.

13. A motor vehicle, comprising:
   an internal combustion engine;
   an exhaust-gas treatment device configured to purify exhaust gases of said internal combustion engine;
   a doser configured to supply reducing agent to said exhaust-gas treatment device; and
   a control unit constructed and configured to operate said doser for adding the reducing agent to said exhaust-gas treatment device by carrying out the following steps:
   a) determining a dosing amount of the reducing agent required by said exhaust-gas treatment device;
   b) determining an operating mode for said doser by carrying out at least the following steps:
      b.1) determining, directly at said doser, at least one characteristic operating value of at least one component of said doser being definitive of a degree of aging of said doser, said at least one characteristic operating value referring to a property of said at least one component of said doser, said property not fluctuating over short timescales making said property a count variable;
      b.2) setting said operating mode for said doser in dependence on said at least one characteristic operating value from step b.1);
   c) operating said doser with said set operating mode to supply said dosing amount required in accordance with step a) to said exhaust-gas treatment device; and
   d) setting a number of repetitions in which the method is executed with the steps a) and c), increasing a counter in each case, until the counter has reached the number of repetitions, and then executing steps b.1) and b.2).

14. A method for operating a doser for adding an additive to an exhaust-gas treatment device, the method comprising the following steps:
   a) determining a dosing amount of the additive required by the exhaust-gas treatment device;
   b) determining an operating mode for the doser by carrying out at least the following steps:
      b.1) determining, directly at the doser, at least one characteristic operating value of at least one component of the doser being definitive of a degree of aging of the doser;
      b.2) setting the operating mode for the doser in dependence on the at least one characteristic operating value from step b.1): and
   c) operating the doser with the set operating mode to supply the dosing amount required in accordance with step a) to the exhaust-gas treatment device:
   giving consideration for determining the at least one characteristic operating value in step b.1) to at least one of the following parameters relevant to the aging of the doser:
      number of dosing processes having been previously performed,
      or
      past operating duration of the doser.

15. A method for operating a doser for adding an additive to an exhaust-gas treatment device, the method comprising the following steps:
   a) determining a dosing amount of the additive required by the exhaust-gas treatment device;
   b) determining an operating mode for the doser by carrying out at least the following steps:
      b.1) determining, directly at the doser, at least one characteristic operating value of at least one component of the doser being definitive of a degree of aging of the doser:
      b2) setting the operating mode for the doser in dependence on the at least one characteristic operating value from step b.1); and
   c) operating the doser with the set operating mode to supply the dosing amount required in accordance with step a) to the exhaust-gas treatment device;
   giving consideration for determining the at least one characteristic operating value in step b.1) to at least a number of occurrences of the following events relevant to the aging of the doser:
      number of freezing processes to which the doser has been exposed,
      number of emergency deactivations of the doser,
      number of hot shutdown processes of an internal combustion engine connected to the exhaust-gas treatment device,
      number of instances of misfueling of a tank from which the doser extracts the additive, or
      number of phases in which the doser has been deactivated for longer than a predefined time interval.

16. A method for operating a doser for adding an additive to an exhaust-gas treatment device, the method comprising the following steps:
   a) determining a dosing amount of the additive required by the exhaust-gas treatment device;
   b) determining an operating mode for the doser by carrying out at least the following steps:

b.1) determining, directly at the doser, at least one characteristic operating value of at least one component of the doser being definitive of a degree of aging of the doser;

b.2) setting the operating mode for the doser in dependence on the at least one characteristic operating value from step b.1); and c) operating the doser with the set operating mode to supply the dosing amount required in accordance with step a) to the exhaust-gas treatment device;

giving consideration for determining the at least one characteristic operating value in step b.1) to the following operating condition having prevailed during the operation of the doser in at least one prior time interval: load range in which the doser has been operated.

17. A motor vehicle, comprising:

an internal combustion engine;

an exhaust-gas treatment device configured to purify exhaust gases of said internal combustion engine;

a doser configured to supply reducing agent to said exhaust-gas treatment device; and a control unit constructed and configured to operate said doser for adding the reducing agent to said exhaust-gas treatment device by carrying out the following steps:

a) determining a dosing amount of the reducing agent required by said exhaust-gas treatment device;

b) determining an operating mode for said doser by carrying out at least the following steps:

b.1) determining, directly at said doser, at least one characteristic operating value of at least one component of said doser being definitive of a degree of aging of said doser, said at least one characteristic operating value referring to a property of said at least one component of said doser, said property not fluctuating over short timescales making said property a count variable, and giving consideration, for determining the at least one characteristic operating value in step b.1), to at least a number of occurrences of the following events relevant to the aging of the doser:

number of freezing processes to which the doser has been exposed, number of emergency deactivations of the doser, number of hot shutdown processes of an internal combustion engine connected to the exhaust-gas treatment device, number of instances of misfueling of a tank from which the doser extracts the additive, or number of phases in which the doser has been deactivated for longer than a predefined time interval;

b.2) setting said operating mode for said doser in dependence on said at least one characteristic operating value from step b.1); and c) operating said doser with said set operating mode to supply said dosing amount required in accordance with step a) to said exhaust-gas treatment device.

* * * * *